US006233809B1

(12) United States Patent
Geffros et al.

(10) Patent No.: US 6,233,809 B1
(45) Date of Patent: May 22, 2001

(54) FLEXIBLE CUTTING KNIVES AND METHOD OF MOUNTING CUTTING KNIFE CAVITIES WITH MOUNTING BRACES ON A NON METALLIC MOUNTING BOARD

(75) Inventors: Michael R. Geffros, Fort Gratiot, MI (US); Gary S. Levene, Kitchener (CA)

(73) Assignee: Ontario Die Company Limited (CA)

( * ) Notice: Subject to any disclaimer, the term of this patent is extended or adjusted under 35 U.S.C. 154(b) by 0 days.

(21) Appl. No.: 09/273,201

(22) Filed: Mar. 19, 1999

Related U.S. Application Data

(62) Division of application No. 08/711,960, filed on Sep. 6, 1996.

(51) Int. Cl.[7] .................................................. B23P 11/00

(52) U.S. Cl. .......................... 29/525.11; 83/620; 83/694; 83/695; 83/698.11; 83/699.51; 83/954

(58) Field of Search ............................ 29/401.1, 525.01, 29/525.11; 83/698.11, 698.71, 699.11, 699.51, 954, 694, 620, 698.91, 695

(56) References Cited

U.S. PATENT DOCUMENTS

| | | | | |
|---|---|---|---|---|
| 123,127 | | 1/1872 | Schoettle | 83/684 |
| 340,976 | * | 5/1886 | Butterworth | 83/695 |
| 931,830 | | 8/1909 | Zimmerman | 83/652 |
| 950,003 | | 2/1910 | MacFarland | 83/652 |
| 954,559 | | 4/1910 | Zimmerman | 83/652 |
| 999,844 | | 8/1911 | Nilsson | 83/652 |
| 1,115,079 | | 10/1914 | Lynch | 83/652 |
| 1,177,005 | | 3/1916 | Zimmerman | 83/652 |
| 1,307,041 | | 6/1919 | Crawford | 83/658 |
| 1,471,653 | | 10/1923 | Fitzgerald | 83/652 |
| 1,505,774 | | 8/1924 | Fitzgerald | 83/652 |
| 1,683,934 | * | 9/1928 | Timmons | 83/695 |
| 1,915,657 | | 6/1933 | Findlater | 76/107.1 |
| 2,095,359 | | 10/1937 | Dudley | 101/391 |
| 2,165,394 | * | 7/1939 | Lyness | 83/695 |
| 2,245,770 | | 6/1941 | Franzmann | 30/358 |
| 2,251,432 | | 8/1941 | Wall et al. | 83/652 |
| 2,425,082 | | 8/1947 | Bolston | 83/652 |
| 2,860,555 | | 11/1958 | Williamson | 493/476 |
| 2,863,337 | | 12/1958 | Ackley | 76/107.1 |
| 2,873,627 | | 2/1959 | Smith | 76/107.1 |
| 3,178,976 | | 4/1965 | Kraut | 83/125 |
| 3,217,579 | | 11/1965 | Rubico et al. | 83/652 |
| 3,373,643 | | 3/1968 | Spengler | 83/620 |
| 3,383,969 | | 5/1968 | Saunders | 83/663 |
| 3,520,220 | * | 7/1970 | Acker | 83/695 |
| 3,616,720 | * | 11/1971 | Larson | 83/691 |
| 3,695,134 | | 10/1972 | Hardwick | 83/451 |
| 3,739,676 | * | 6/1973 | Gerdin | 83/698 |
| 3,826,170 | | 7/1974 | Jones et al. | 83/657 |

(List continued on next page.)

FOREIGN PATENT DOCUMENTS

| | | |
|---|---|---|
| 1359307 | 3/1964 | (FR) . |
| 124877 | 4/1919 | (GB) . |
| 663932 | 12/1951 | (GB) . |

OTHER PUBLICATIONS

Affidavit of Christopher Geffros, dated Dec. 16, 1997 and photographs.

*Primary Examiner*—S. Thomas Hughes
*Assistant Examiner*—Essama Omgba
(74) *Attorney, Agent, or Firm*—Dykema Gossett PLLC

(57) ABSTRACT

A cutting knife assembly has a baseboard with a generally planar surface. A cutting knife is detachably connected to the baseboard. The cutting knife extends in a perpendicular direction to the baseboard. The cutting knife circumscribes a knife cavity on the baseboard. At least one elongated cross member is affixed to the cutting knife and extends across the knife cavity. The cross member is mounted to the baseboard by a removable fastener. The cutting knife may then be easily removed from the baseboard and resecured.

3 Claims, 3 Drawing Sheets

U.S. PATENT DOCUMENTS

| | | | | |
|---|---|---|---|---|
| 4,002,092 | | 1/1977 | Smith et al. | 83/55 |
| 4,444,075 | | 4/1984 | Mulry | 83/128 |
| 4,476,762 | | 10/1984 | Anderson, III et al. | 83/640 |
| 4,494,426 | * | 1/1985 | Hartzell | 83/698.91 |
| 4,744,036 | | 5/1988 | Van Tiggelen | 700/206 |
| 5,029,505 | | 7/1991 | Holliday | 83/652 |
| 5,333,519 | | 8/1994 | Holliday et al. | 76/107.8 |
| 5,983,766 | * | 11/1999 | Johnson | 83/698.61 |

* cited by examiner

FLEXIBLE CUTTING KNIVES AND METHOD OF MOUNTING CUTTING KNIFE CAVITIES WITH MOUNTING BRACES ON A NON METALLIC MOUNTING BOARD

This application is a divisional of U.S. application Ser. No. 08/711,960 filed Sep. 6, 1996, entitled 'Flexible Cutting Knives and Method of Mounting Cutting Knife Cavities with Mounting Braces on a Non-metallic mounting Board'.

BACKGROUND OF THE INVENTION

1. Technical Field

The present invention relates to cutting knives for die cutting, and more particularly, to a method and apparatus for mounting cutting knife cavities onto a baseboard.

2. Discussion of the Related Art

Cutting knives are commonly used for cutting sheet material such as cloth or vinyl. Cutting knives are also referred to in the industry as cutting dies. Typically, a cutting knife assembly has a support board with a cutting blade or knife mounted thereto shaped to cut a desired pattern. The cutting knife assembly is mounted into a press. The sheet material is fed into the press. The press forces the cutting blades or knives through the sheet material to cut the desired pattern. A common press type is a clicker die press.

The cutting knives are mounted to the support plate which is commonly wood or steel. Wood is preferred because of its low cost compared to steel. A typical method for mounting a cutting knife is by machining a channel into the support plate corresponding to the shape of the desired pattern and securing the cutting knife within the channel. The support plate is typically machined in a machine shop at a location remote from the manufacturing area and then brought to the press for assembly.

Sheet material comes in a variety of widths. It is common for the widths of a particular material to vary several inches between rolls. It is highly desirable to fully utilize the material to minimize waste. As material widths change, placement of the fixed cutting edges may not fully utilize the material unless rearranged.

Conventional cutting knife mounting methods do not allow for the easy removal and rearrangement of the cutting knife to fully utilize different material widths or improved layouts. Because the modifications to the support plate are performed off-line, substantial time and effort are required to rearrange the knives. So much effort is required that a substantial material width change is required before rearranging is cost effective.

Conventional machining methods used in the mounting of cutting knives result in permanent modification to the base plate. Subsequent changes in cavity layout require new baseplate material. New baseplate material substantially increase cost of a new arrangement.

It is therefore desirable to have the capability to quickly and cost-effectively rearrange the cutting knives to fully utilize the available material.

SUMMARY OF THE INVENTION

It is therefore one object of the invention to provide a technique for mounting cutting knives on a baseboard that allows for the inexpensive and expeditious rearrangement of the cutting knives to optimize material usage.

A preferred embodiment of the present invention includes a non-metallic baseboard that has a generally planar surface. A cutting knife extends in a generally perpendicular direction to said baseboard and circumscribes a knife cavity. The cutting knife has an elongated cross member affixed to the cutting knife that extends across the knife cavity. The cross member provides a means for affixing the cross member to the baseboard. One method for attaching the cutting knives to the baseboard is by screwing through the cross member into the baseboard. If the cutting knives need to be removed, the cutting knife is quickly unscrewed, preferably using a power screwdriver, and remounted on the assembly line.

In one aspect of the invention, a method for cutting sheet material includes providing a plurality of cutting knives with an integral cross member, arranging the plurality of cutting knives in a predetermined pattern on the baseboard and securing the cutting knives to the baseboard by screwing a fastener through the cross member and into the baseboard. By using a fit-type computer program, cavity layouts may be constantly improved so that the cut material is more efficiently used.

One advantage of the present invention is that a relatively inexpensive wood baseboard may be used. The life of a wood baseboard is prolonged by the present invention since the cross members are preferably placed adjacent to the baseboard to distribute the load of the press across the surface of baseboard.

BRIEF DESCRIPTION OF THE DRAWINGS

Other objects and advantages of the present invention become apparent from the following detailed description that should be read in conjunction with the drawings in which.

DETAILED DESCRIPTION OF THE PREFERRED EMBODIMENT

Figure 1:
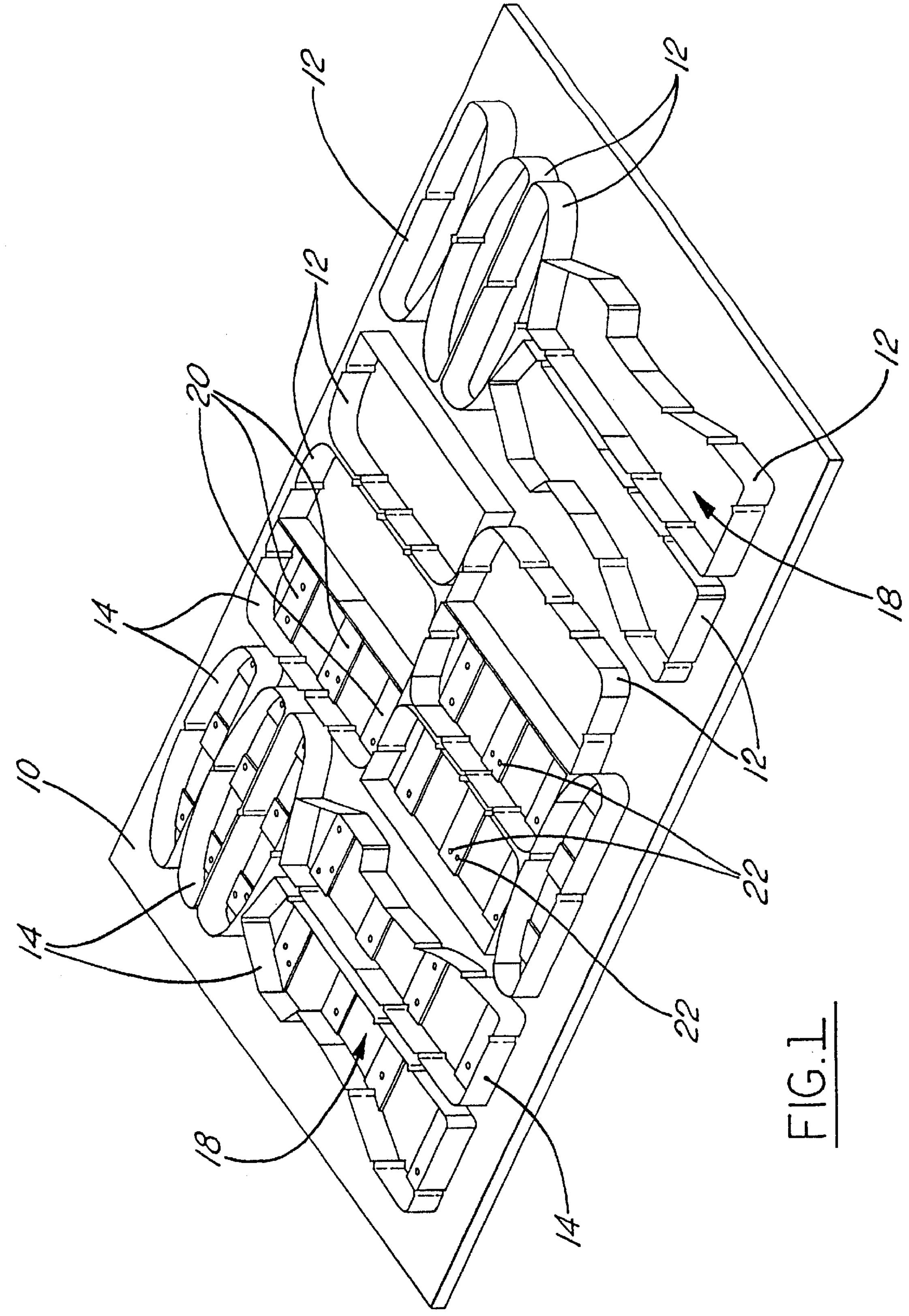
FIG. 1 is an isometric view of a baseboard having cutting knife cavities mounted both in accordance with the present invention and in a conventional manner.

Referring now to the drawings, like reference numerals are used to identify identical components in the various figures. Although the invention will be described and illustrated in the context of a knife assembly particularly suited for use in a clicker die press, it will be appreciated that the invention may be used in conjunction with other well known types of presses.

Referring now to FIG. 1, a baseboard 10 is shown having both conventional cutting knives 12 and flexible cutting knives 14 mounted thereon. Baseboard 10 is preferably made from a hard wood such as birch, beech or maple. One constructed embodiment used a baseboard constructed of 16 mm thick beech.

Flexible cutting knives 14 are flexible in the sense that they are easily removed and fastened in different locations upon baseboard 10. Each of cutting knives 12 and 14 are preferably made from a durable metallic material that is easily sharpened such as steel. Each cutting knife 14 circumscribes a knife cavity 18 that defines a desired pattern to be cut from sheet material. Each cutting knife 14 is preferably formed of a single piece of steel. Several pieces, however, may be used to form cutting knife 14.

Flexible cutting knives 14 have at least one elongated cross member 20 extending across knife cavity 18. Both ends of cross member 20 are affixed to a flexible cutting knife 14. Cross member 20 have holes 22 through which a fastener is placed to secure flexible cutting knives 14 to baseboard 10. Holes 22 are preferably preformed. Holes 22 may also be formed when affixing the flexible cutting knives to baseboard 10.

Figure 2:
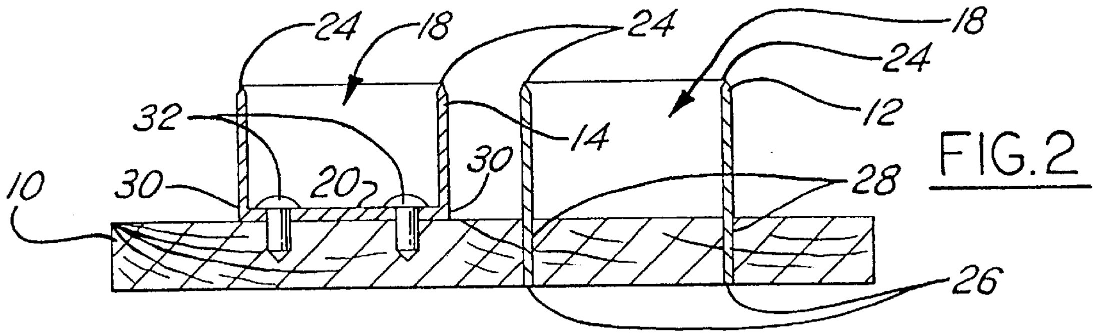
FIG. 2 is a cross sectional view of FIG. 1 having a wooden baseboard through a cutting knife cavity according to the present invention and mounted in a conventional manner.

Referring now to FIG. 2, flexible cutting knives 14 and conventional cutting knives 12 both have a first edge 24 that is sharpened to cut through the material.

Conventional cutting knives 12 have a second edge 26 that is used to secure conventional cutting knife 12 to baseboard 10. In conventional mounting methods, a groove 28 is cut into baseboard 10 to the shape of knife cavity 18 that extends through baseboard 10. Groove 28 must be specially machined and assembled offline in a labor and time intensive operation. Conventional machining of the baseboard does not allow for the efficient modification of the layout of the knife cavities. For example, the baseboard 10 must be removed from the press, sent to the manufacturer, retooled and then brought back to the press and reinstalled.

Flexible cutting knives 14 have a second edge 30. Second edge 30 is preferably planar in cross section. The plane is preferably parallel to the plane of baseboard 10. Cross member 20 is preferably affixed adjacent edge 30. Cross member 20 may be affixed to edge 30 by welding. Cross member 20 preferably has a substantially planar surface that lies adjacent to the surface of baseboard 10 and is preferably contiguous with second edge 30. Cross member 20 is secured to baseboard 10 by way of a screw 32 or other easily removable fasteners.

When using a flexible cutting knife configuration, baseboard 10 does not need to be removed from the press to adjust the placement of flexible cutting knives 14. A power screwdriver or a similar tool (not shown) may be used to remove screws 32 from baseboard 10. In the same manner, the flexible cutting knife 14 may be located in a different area on baseboard 10 and resecured by screwing screw 32 through holes 22 and into baseboard 10. In this manner, no offline pre-drilling or processing is required since baseboard 10 is made of a material through which a screw 32 can be easily mounted. Time for removing and resecuring is minimal compared to processing the baseboard off line.

Figure 3:
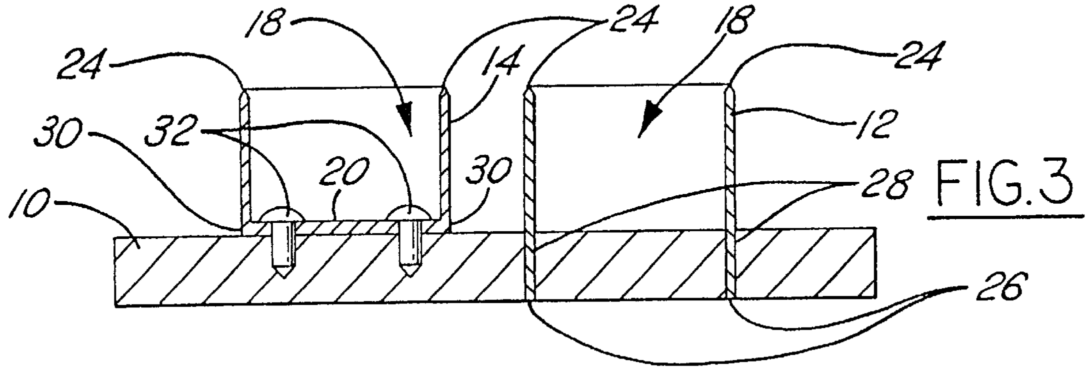
FIG. 3 is a similar cross section to that of FIG. 2 having a non-metallic baseboard other than wood.

Referring now to FIG. 3, the material of baseboard 10 is shown as another non-metallic material such as a pressed fiberboard or a plastic material. The material should be resilient to the forces in a press operation but able to be screwed into so that flexible cutting knives 14 may be easily rearranged on baseboard 10.

Figure 4:
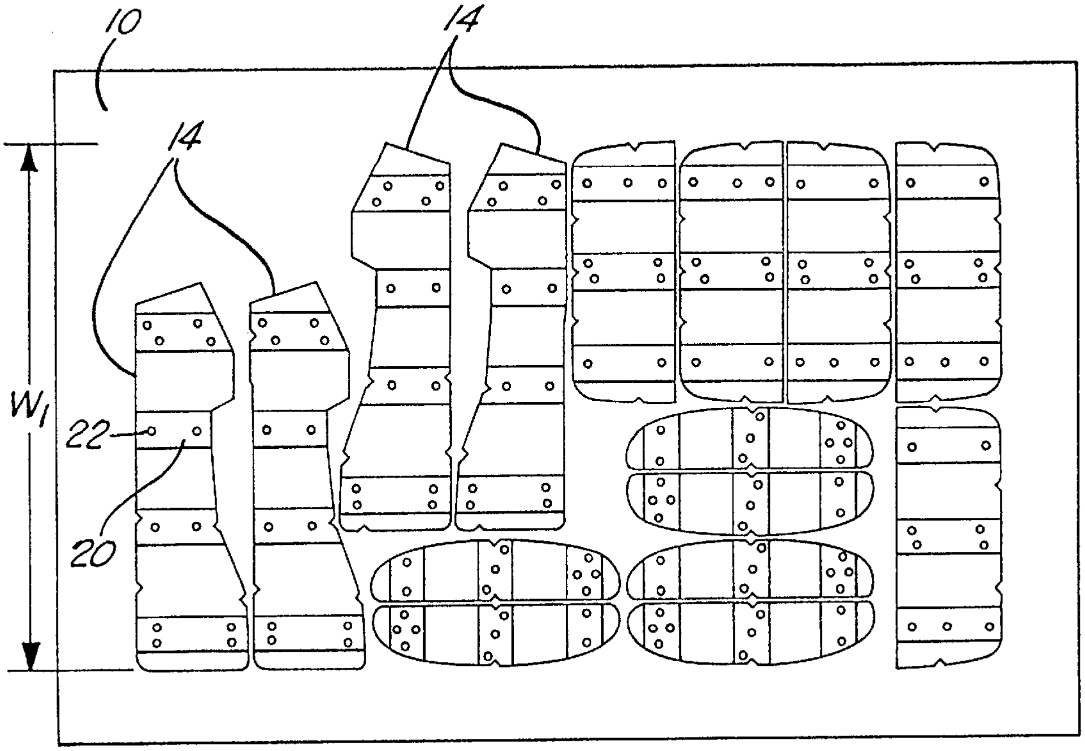
FIG. 4 is a top view of a baseboard having knife cavities mounted according to the present invention for material having a first width.

Referring now to FIG. 4, the sheet material typically comes in a variety of widths. It is not uncommon for manufacturers of sheet material to provide a roll of material several inches wider than the material ordered. The flexible cutting knives 14 of FIG. 4 are optimized to fit a material having a width $W_1$.

Figure 5:
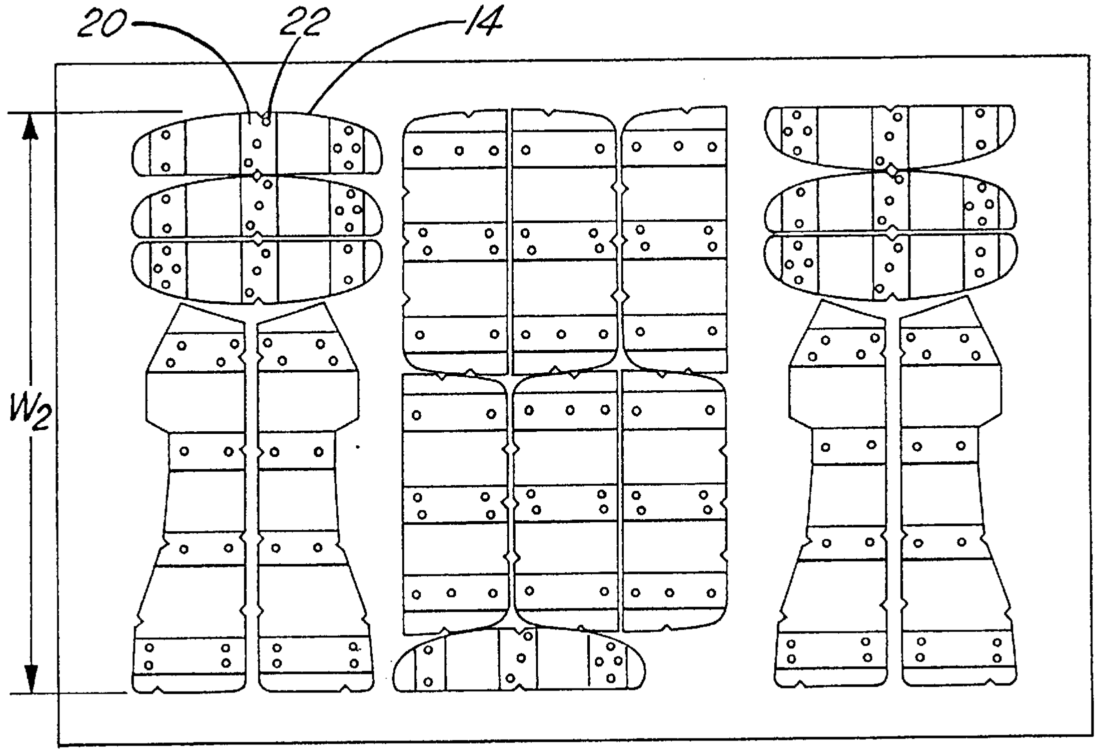
FIG. 5 is a top view of a baseboard having knife cavities mounted according to the present invention using sheet material wider than that of FIG. 4.

Referring now to FIG. 5, flexible cutting knives 14 have been rearranged to be optimized for a new material width $W_2$. Width $W_2$ is greater than that of width $W_1$. Several more patterns may be cut as compared to that of a narrower width material. A conventional best fit-type computer program may be used to help determine an optimum arrangement for flexible cutting knives 14.

Figure 6:
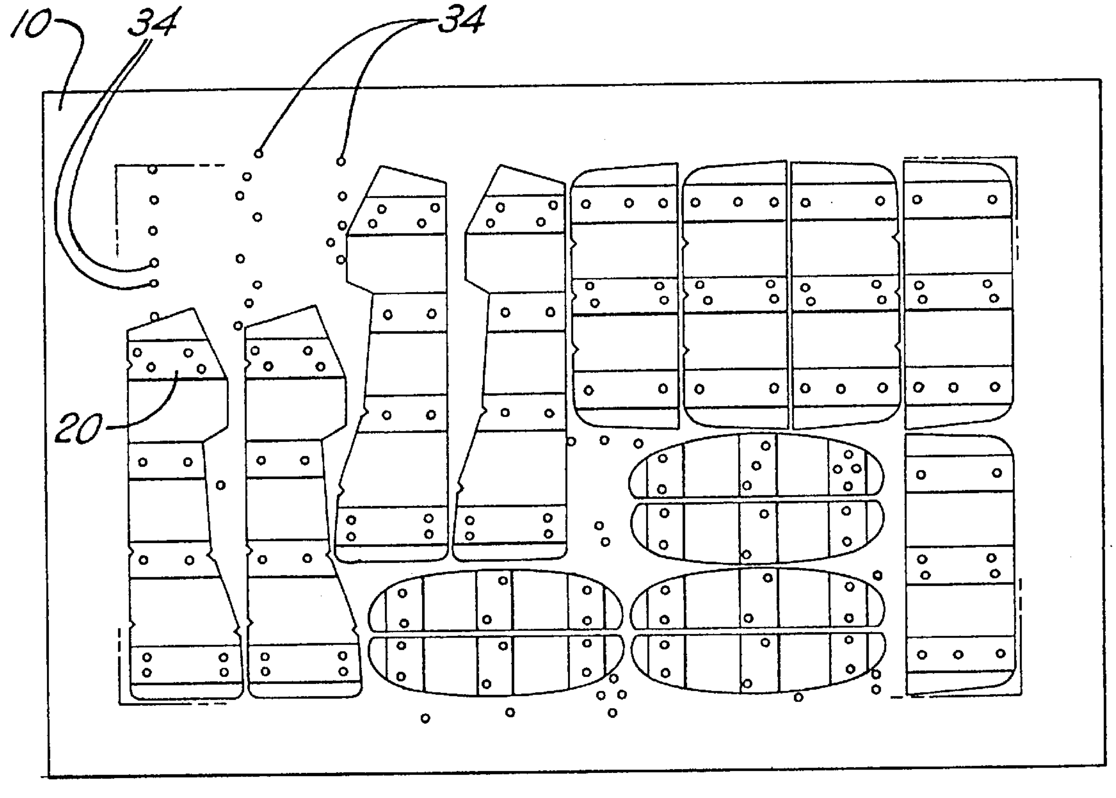
FIG. 6 is a top view of a baseboard after several successive cutting knife rearrangements.

Referring now to FIG. 6, eventually baseboard 10 will end up with a multitude of screw holes 34 from the process of removing and resecuring flexible cutting knives 14. Baseboard 10 will eventually break down once a sufficient number of screw holes 34 are formed. Cross members 20, however, help distribute the load from the force of the press over a wide area of baseboard 10 to help prolong the life of baseboard 10.

In practice, the present invention may be used alone as shown in FIGS. 4 through 6 or may be used in combination with a conventional die mounting method such as that shown in FIG. 1.

If sheet material has a different width from that which the cutting knives are currently set, the knives may be configured to provide for a minimum amount of waste. This can be done manually or by using a computer program to find the optimum fit for the patterns to be cut. Once this configuration is known, the flexible cutting knives 14 are secured to baseboard 10 by using a power screwdriver to drive a screw through holes 22 and into baseboard 10. Once again, there is no need for pre-drilling baseboard 10 since baseboard 10 is of a material that a power screwdriver may easily drive a screw into.

While the best mode for carrying out the present invention has been described in detail, those familiar with the art to which this invention relates, will recognize various alternative designs and embodiments for practicing the invention as defined by the following claims.

What is claimed is:

1. A method for assembling a cutting knife assembly, said assembly having a wood baseboard comprising the steps of:

providing a plurality of cutting knives each having an integral cross member;

arranging said plurality of cutting knives in a predetermined configuration;

securing said cutting knives on said wood baseboard by screwing a screw through said cross member and into said wood baseboard, such that said cutting knives are in direct contact with said wood baseboard;

removing said screw by unscrewing said screw;

moving said cutting knife; and resecuring said cutting knife by screwing said screw through said cross member directly into said wood baseboard.

2. The method as recited in claim 1 wherein said predetermined configuration substantially minimizes waste from a sheet of material.

3. A method for detachably assembling a cutting knife assembly on to a wood baseboard provided with a planar surface comprising the steps of:

providing on the planar surface a plurality of flexible steel cutting knives, each knife circumscribing a knife cavity and having first and second edges and inner and outer surfaces with said outer surface being unbounded and with an integral elongate cross member having a surface coplanar with said second edge;

placing the second edge of each flexible steel cutting knife on said planar surface in direct contact therewith, with each flexible cutting knife extending in a generally perpendicular direction to said wood baseboard;

arranging said plurality of flexible steel cutting knives in a predetermined configuration on the planar surface, with the corresponding first edge extending in a direction away from said planar surface;

removably securing the flexible steel cutting knives on said wood baseboard by screwing a screw through each cross member directly into said wood baseboard thereby rigidly attaching the cross member and the corresponding flexible steel cutting knife thereto;

removing each screw from the corresponding flexible steel cutting knife by unscrewing the screw;

adjusting said flexible steel cutting knife on the planar surface; and resecuring each flexible steel cutting knife by screwing said screw through each cross member directly into said wood baseboard thereby rigidly attaching the cross member and the corresponding flexible steel cutting knife directly to the base board.

* * * * *